Sept. 30, 1958    C. O. SCHMIDT, JR    2,854,047
SHREDDER SPOOL WITH BAR KNIVES
Filed Sept. 12, 1956    2 Sheets-Sheet 1
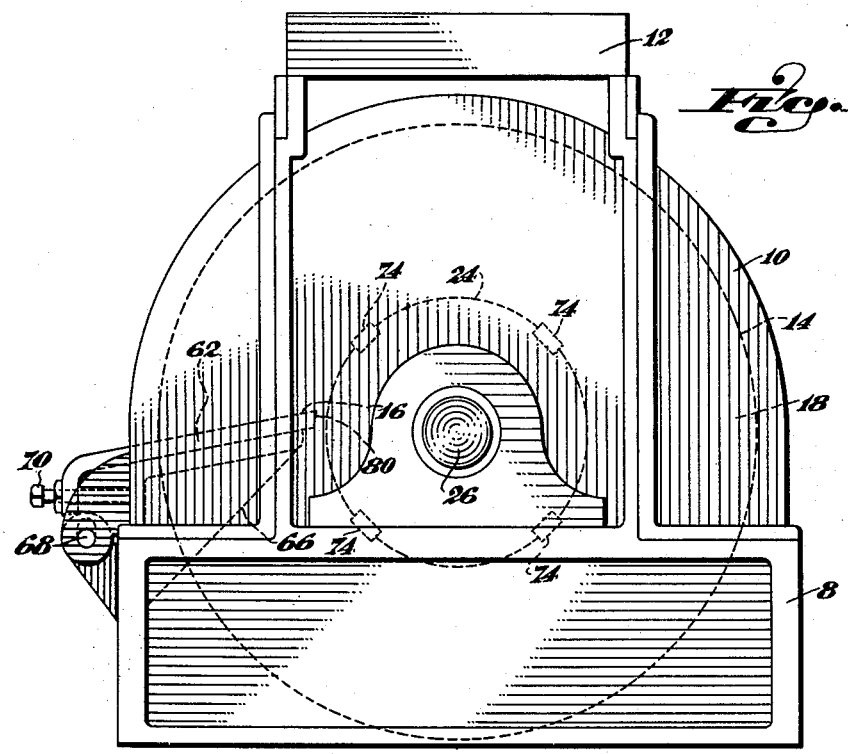
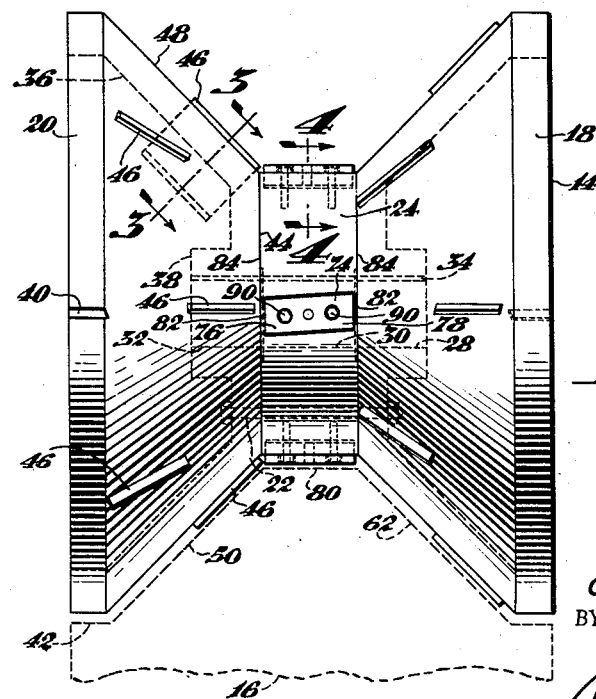
INVENTOR.
CARL OSCAR SCHMIDT, JR.
BY
*J. Warren Kinney, Jr.*
ATTORNEY Sept. 30, 1958 C. O. SCHMIDT, JR 2,854,047
SHREDDER SPOOL WITH BAR KNIVES
Filed Sept. 12, 1956 2 Sheets-Sheet 2

INVENTOR.
CARL OSCAR SCHMIDT, JR.
BY
J. Warren Kinney Jr.
ATTORNEY

United States Patent Office 2,854,047
Patented Sept. 30, 1958

2,854,047

SHREDDER SPOOL WITH BAR KNIVES

Carl Oscar Schmidt, Jr., Wyoming, Ohio, assignor to The Cincinnati Butchers' Supply Company, Cincinnati, Ohio, a corporation of Ohio Application September 12, 1956, Serial No. 609,375

3 Claims. (Cl. 146—123)

This invention relates to a shredder spool, or rotor, for use in a machine the purpose of which is to reduce to small pieces the bones, carcasses, and other primal parts of animals, so that the pieces may be most efficiently subjected to cooking or rendering to produce the maximum yield of high quality fats and tankage. The shredder incorporating the improved spool or rotor, generally includes a hopper which directs to the rapidly rotating spool the bones and primal parts of animals and carcasses, and as the spool rotates in close proximity to one or more anvils, or stationary knives, the material is reduced to pieces of substantially uniform thickness which will cook evenly and uniformly in the kettle or cooker. By achieving uniformity of size in the particles to be cooked, there is eliminated the customary objectionable over-cooking of any finer particles, in the effort to thoroughly cook the larger particles. Prior to the development of the present invention, unwanted low-grade dark grease and tallow resulted from the over-cooking of fine particles, and this materially reduced the quality, value and desirability of the cooked product.

An object of the invention is to improve the construction of the shredder spool of a machine for the purpose stated, to ensure production of uniformity in shredding and subsequent cooking or rendering, of bones and primal parts of animals and carcasses.

Another object of the invention is to improve the quality and appearance of tallow, grease, or fat rendered from animal products.

A further object is to reduce the cost and expedite the production of high quality grease and tallow, by so preparing the animal products for cooking or rendering as to require a minimal cooking period and lower than usual cooker pressures in the process.

These and other objects are attained by the means described herein and illustrated upon the accompanying drawings, in which:

Fig. 1 is a side elevational view of a typical shredder incorporating the improved spool or rotor of the invention.

Fig. 2 is a plan view of the improved spool or rotor, apart from the shredder casing.

Figure 3:
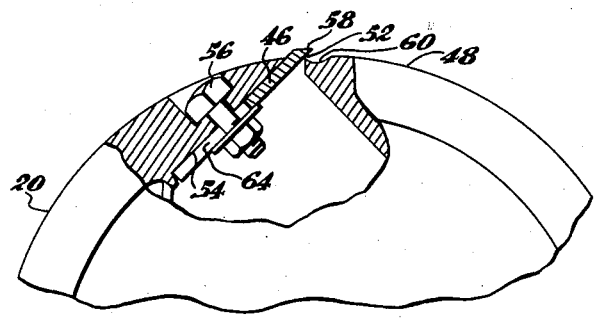
Fig. 3 is a fragmentary enlarged cross-sectional view taken on line 3—3 of Fig. 2.

With reference to the drawings, Fig. 1 illustrates a typical shredder casing 8 generally rectangular in plan, including an inverted half-cylindrical hood portion 10 above which is located an open-topped hopper ring 12 through which may be introduced the bones, carcasses, and other primal parts of an animal to be shredded. Within the confines of the casing is rotatably supported a spool or rotor 14 carrying a plurality of staggered knives, the function of which is to slice and shear the contents of the shredder as the spool is rapidly rotated in close proximity to one or more anvils or stationary knives 16 supported by and extended into the casing. The material shredded in the machine drops to the lower part of the casing, and from there it may be directed to a kettle or cooker designed to render the shredded material, to produce grease or tallow.

Figure 4:
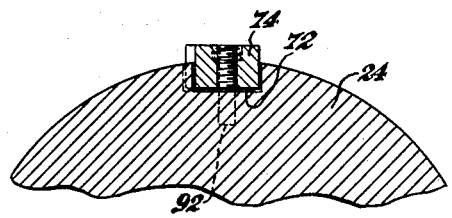
Fig. 4 is a fragmentary enlarged cross-sectional view taken on line 4—4 of Fig. 2.

The spool or rotor, as illustrated by Figs. 2, 3 and 4, may comprise two frusto-conical discs 18 and 20 secured as by means of bolts 22 or other fastening devices, to opposite ends of a center disc 24. The three discs referred to are transversely bored at their centers, to receive a rotor shaft 26 upon which the discs are fixed, so that the discs rotate in unison as the shaft is driven rapidly by means of a motor or engine, not shown. The central bores of the discs are indicated at 28, 30 and 32, and each may be formed with a keyway 34 to receive a suitable key applied in known manner to lock the discs against relative rotation upon the rotor shaft.

Inasmuch as the two frusto-conical end discs are identical, though reversed, in construction, a description of disc 20 will suffice also for disc 18. As indicated, the outer face 36 may be made concave to conserve metal, and centrally thereof may be formed the hub 38 for bore 32. The narrow peripheral rim of the disc may carry a fixed knife 40, or perhaps several of such knives, extending from the rim to pass very closely an end section 42 of anvil 16, to shear and slice any material which may be carried around by the rim as the disc rotates.

Between the outer rim and the reduced inner face 44 of the disc, a series of angularly disposed knives 46 project slightly from the inclined face 48, as in Fig. 3, to co-operate with the angular side 50 of the anvil for shearing and slicing any material carried around by the inclined surface of the disc. The several knives 46 preferably are staggered upon the disc surface 48 as shown, to ensure a complete shearing treatment for all material in contact with the disc.

The knives 46 may be mounted upon disc 20 as illustrated by Fig. 3, wherein is shown an elongate slot 52 to accommodate the knife, and through which the knife extends for exposure of its sharpened edge 58 slightly beyond the surface 48 of the disc. The material of the disc may be cut away along one side of the slot to provide a flat pad 54 against which the knife body is firmly held by means of bolts 56 passing through the pad and the body of the knife. Adjacent to the sharp edge 58 of the knife, the material of the disc may be undercut, providing a groove 60 as long as the knife edge, for relieving the edge of any material tending to compact against the leading edge of the knife.

The knives of both discs 20 and 18 may be mounted and arranged as above explained, to shear and slice the material at the side edges 50 and 62 of the anvil. The knife edges may be adjusted to the anvil for slight clearance, by providing elongate slots 64 in the knife bodies, allowing inward and outward shifting of the knives when the bolts 56 are loosened. The anvil 16 also is subject to adjustment by reason of its being mounted upon a carrier 66 pivoted to the casing at 68, and having an adjusting screw 70 whereby the carrier may be rotated about pivot 68 to elevate and lower the inner end of the anvil.

Referring now to the construction of the center disc 24, it may be noted that said center disc is in the form of a cylinder whose diameter approximates the diametral distance across the reduced inner face 44 of the conical disc. The peripheral face of the center disc is milled or otherwise grooved transversely at several locations, to provide seats 72 each accommodating a bar knife 74 that projects outwardly of the disc periphery. The groove or seat 72 in each instance is oblique to the plane of disc 24, so that when the bar knife 74 is seated therein and fixed against movement, the knife will have a leading end 76 and a trailing end 78 to approach the anvil edge 80, one ahead of the other, producing a shearing rather than a mere chopping action upon any material brought to the anvil by a knife 74. The knives 74 therefore, as well as the grooves 72, are of regular parallelogramic shape, that is, opposite sides of the groove will be parallel to one another, and opposite ends thereof likewise will be parallel to one another. The sides and ends of the bar knives are similarly related. The opposite ends 82, 82 of the bar knives may be substantially flush with the opposite parallel faces 84, 84 of the center disc.

Figure 5:
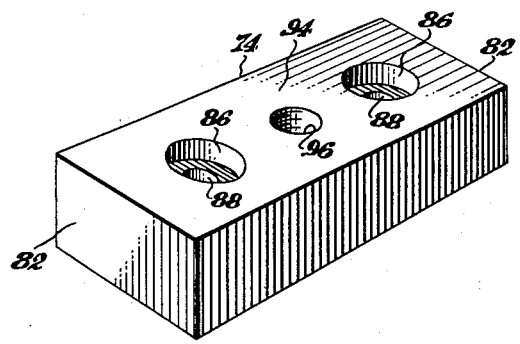
Fig. 5 is an enlarged perspective view of a bar knife constituting part of the invention.

A bar knife 74 is shown in detail by Fig. 5, and may comprise a steel bar substantially square in transverse cross-section, with its length exceeding the width thereof. For securing the bar knife to the center disc, said knife may be provided with two sets of counterbored openings 86, 86 and 88, 88, the smaller bores 88 extending through the bar to the bottom face thereof. The counterbored openings are adapted to receive two screws 90, 90, which engage corresponding threaded bores 92 formed in the base of each groove or slot 72, so that when the screws are inserted in the counterbored openings and drawn up tightly, the bar knife will be anchored securely against the slot base, with the heads of the screws substantially flush with the outer exposed face 94 of the knife. The working face 94 of the knife normally extends beyond the periphery of disc 24 a distance approximating one-fourth the thickness of the knife.

After the shredder has been in service for some time, and a replacement of bar knives appears to be advisable, the screws 90, 90 may be removed to release the knife. Past experience has proven, however, that the knife may not easily be displaced from its groove 72 even after removal of the screws 90, due to a tight compacting of material about the knife and the groove sides, and the possible corrosion which may occur there resulting from chemical action induced by various salts in the animal products fed to the machine. In order to facilitate knife removal, each knife may be drilled and tapped at its middle point, in parallelism with the bores 88, 88 to provide a threaded bore 96 extending through the knife, this threaded bore being receptive of a tool in the form of a correspondingly threaded jack screw to be rotated into the bore until the screw bottoms against the knife seat 72 and lifts the knife from the seat. This method of knife displacement has proven highly effective, and amply powerful to dislodge any knife irrespective of the tenacity with which it may cling to the groove or seat walls. The threaded bore 96 may be kept temporarily plugged during use of the machine, if desired.

The bar knives on the center disc or spool perform in cooperation with the anvil, to materially facilitate and expedite the preparation of animal matter for rendering. The shearing action of the bar knives has proven highly effective for reducing the animal material to particles of uniform thickness without the production of oversized pieces difficult to break down in the course of rendering.

As the final result of the improvements herein disclosed, material treated in the instant apparatus is more completely processed than has been possible heretofore, and consequently, the cooking or rendering treatment which follows the shredding operation will be found productive of high quality grease or tallow which is free of discoloration due to over-cooking. In addition to these advantages are the savings of cooking time and power consumption as previously mentioned.

It is to be understood that various modifications and changes in the structural details of the apparatus may be resorted to, within the scope of the appended claims, without departing from the spirit of the invention.

What is claimed is:

1. In a shredder for animal matter, the combination of a hollow casing having an open top through which animal matter may be fed, a shaft supported upon the casing for rotation, a rotor fixed on said shaft within the casing, said rotor comprising a substantially cylindrical center spool disposed axially upon the shaft, and a pair of frusto-conical discs on the shaft flanking and abutting the center spool in substantial concentricity therewith, said discs each having a narrow peripheral rim defining the overall diameter and the full width of the rotor, a foreshortened knife extending outwardly from each rim, a series of angularly disposed knives extending in staggered relation from the conical surfaces of the frusto-conical discs inwardly toward a plane which bisects the center spool perpendicularly of the shaft, a series of bar knives fixed transversely upon the center spool, with cutting edges exposed outwardly of the cylindrical surface of the center spool, said bar knives having opposite ends disposed substantially at the junction of the center spool with the abutting discs at opposite ends of the spool, and an anvil normally fixed relative to the casing, said anvil having opposite side edges each in spaced parallelism with the conical face of a disc, an intermediate forward edge in spaced parallelism with the cylindrical surface of the center spool, and a pair of terminal edges each in spaced parallelism with one of the narrow rims of a frusto-conical disc.

2. A shredder as set forth in claim 1, wherein the frusto-conical discs are exteriorly recessed from the rims thereof inwardly toward the supporting shaft, affording access to the angularly disposed knives at the conical faces of the discs.

3. A shredder as set forth in claim 1, wherein each bar knife intermediate its opposite ends is drilled and threaded to receive a correspondingly threaded implement for jacking the knife radially away from the center spool.

References Cited in the file of this patent

UNITED STATES PATENTS

| | | |
|---|---|---|
| 485,283 | Larman | Nov. 1, 1892 |
| 1,675,901 | Mitts et al. | July 3, 1928 |
| 2,677,404 | Aasland | May 4, 1954 |